(12) United States Patent
Lee et al.

(10) Patent No.: US 9,318,035 B2
(45) Date of Patent: Apr. 19, 2016

(54) ADVERTISEMENT DISPLAY DEVICE HAVING 3D SHEET

(71) Applicant: KORTEK CORPORATION, Incheon (KR)

(72) Inventors: Gun Ho Lee, Seoul (KR); Kyoung Chan Lee, Seoul (KR)

(73) Assignee: KORTEK CORPORATION (KR)

( * ) Notice: Subject to any disclaimer, the term of this patent is extended or adjusted under 35 U.S.C. 154(b) by 109 days.

(21) Appl. No.: 14/353,043

(22) PCT Filed: Oct. 19, 2012

(86) PCT No.: PCT/KR2012/008587
§ 371 (c)(1),
(2) Date: Apr. 21, 2014

(87) PCT Pub. No.: WO2013/058593
PCT Pub. Date: Apr. 25, 2013

(65) Prior Publication Data
US 2014/0268876 A1    Sep. 18, 2014

(30) Foreign Application Priority Data

Oct. 21, 2011    (KR) ........................ 10-2011-0107818

(51) Int. Cl.
*F21V 7/04* (2006.01)
*G09F 13/04* (2006.01)
(Continued)

(52) U.S. Cl.
CPC .............. *G09F 13/04* (2013.01); *G02B 6/0073* (2013.01); *G09F 13/18* (2013.01); *G09F 19/12* (2013.01); *G09F 23/00* (2013.01); *G09F 2013/189* (2013.01); *G09F 2013/222* (2013.01)

(58) Field of Classification Search
CPC ....... B60R 13/005; G09F 13/00; G09F 13/04; G09F 13/06; G09F 13/18; G09F 19/00; G09F 7/00; B44C 5/04; F21S 10/005
USPC .................................. 362/600–634
See application file for complete search history.

(56) References Cited

U.S. PATENT DOCUMENTS 7,394,596 B1    7/2008  Chung
8,770,812 B2 *  7/2014  Kino ...................... B60Q 1/323
                                                        362/613

(Continued)

FOREIGN PATENT DOCUMENTS

EP    1320771 A2    6/2003
GB    2469882 A    11/2010
(Continued)

OTHER PUBLICATIONS

European Extended Search Report dated Jun. 8, 2015; Application No. 12841403.4; 10 pgs.

(Continued)

*Primary Examiner* — William Carter
(74) *Attorney, Agent, or Firm* — Schmeiser, Olsen & Watts, LLP (57) ABSTRACT

Disclosed is an advertisement display device having a 3D sheet. The advertisement display device having the 3D sheet comprises: a substrate; a backlight unit which is provided on the substrate and irradiates light; and a 3D sheet which is provided on the backlight unit to implement a 3D image by the light irradiated from the backlight unit.

16 Claims, 7 Drawing Sheets

(51) Int. Cl.
*G09F 13/18* (2006.01)
*G09F 19/12* (2006.01)
*G09F 23/00* (2006.01)
*F21V 8/00* (2006.01)
*G09F 13/22* (2006.01)

(56) References Cited

U.S. PATENT DOCUMENTS

2005/0213351 A1* 9/2005 Yang .................. B60Q 1/323
                                                    362/633
2006/0104091 A1   5/2006 Chen et al.
2008/0090031 A1*  4/2008 Hirzmann ........... B60R 13/005
                                                    428/31
2009/0237914 A1   9/2009 Lai et al.
2011/0065480 A1   3/2011 Kim et al.

FOREIGN PATENT DOCUMENTS

| | | |
|---|---|---|
| JP | 2003308037 A | 10/2003 |
| JP | 2008-070698 A | 3/2008 |
| JP | 2010-153044 A | 7/2010 |
| KR | 10-2006-0126342 A | 12/2006 |
| WO | WO9618987 A1 | 6/1996 |
| WO | WO2008120878 A1 | 10/2008 |

OTHER PUBLICATIONS

PCT/KR2012/008587—International File Date: Oct. 19, 2012—International Search Report; Kortek Corporation; 2 pgs.

* cited by examiner

ADVERTISEMENT DISPLAY DEVICE HAVING 3D SHEET

FIELD OF TECHNOLOGY

The following relates to an advertisement display device having a three-dimensional (3D) sheet, and more particularly, to an advertisement display device having a 3D sheet, which can secure visible and decorative effects by providing a 3D image to a light guide panel of a backlight unit disposed in a gaming machine, thereby enticing a user to the gaming machine.

BACKGROUND

In general, a slot machine or similar gaming machine for a casino includes an advertisement display device in order to entice a game participant to the gaming machine. To this end, the advertisement display device is disposed at an upper front side of a main body of the gaming machine and has a design and ornamental lettering for informing a game participant of game contents or for arousing the curiosity of the game participant.

In the advertisement display device, a planar image is printed on a front side of a panel and illuminated by a light source disposed at a rear or lateral side of the panel, thereby producing a two-dimensional (2D) image.

Existing advertisement display devices can display only 2D images and thus use a sensational design and ornamental lettering so as to excite a game participant's interest.

In this regard, one example of the advertisement display devices is disclosed in Korean Patent Publication No. 10-2006-0126342A (published on Dec. 7, 2006) entitled "DISPLAY DEVICE HAVING VARIOUS SHAPES AND GAMING MACHINE WITH THE SAME".

SUMMARY

Technical Problem

It is an aspect of the present invention to provide an advertisement display device having a 3D sheet, in which the 3D sheet is attached to a light guide panel of a backlight unit disposed in a gaming machine and provides a sense of three-dimension to a character or figure, such that the gaming machine can be seen from a distance, thereby enticing a game participant to the gaming machine and attracting maximum attention.

Technical Solution

In accordance with one aspect of the present invention, an advertisement display device having a three-dimensional (3D) sheet includes: a substrate; a backlight unit disposed on the substrate and emitting light; and a 3D sheet disposed on the backlight unit to display a 3D image by the light emitted from the backlight unit.

The substrate may be provided with a plurality of first light sources in an upper peripheral region thereof.

The first light sources may include monochromatic or three-color light emitting diodes, and may be arranged at regular intervals in the peripheral region of the substrate.

The backlight unit may include: a light guide panel disposed in a central region of the substrate; a second light source disposed on the substrate and arranged on a circumferential surface of the light guide panel; and a reflective sheet attached to a rear side of the light guide panel such that light emitted from the second light source illuminates the light guide panel in a forward direction.

The second light source may include a white LED or three-color LEDs.

The advertisement display device may further include a finishing member surrounding outer edges of the 3D sheet, the backlight unit and the substrate.

The finishing member may include: a flange latched to an upper corner of the 3D sheet; and a plurality of latch hooks latched to a lower side of the substrate.

The finishing member may be translucently formed by applying a translucent layer to an outer or inner surface thereof or by adding a translucent material to a transparent resin.

The advertisement display device may further include: a pop-up member placed in a certain region on the 3D sheet and providing a pop-up image of a character or figure.

The pop-up member may include a transparent member including a character or figure shape and attached to the 3D sheet; and a two-dimensional (2D) print layer printed on the transparent member.

The 3D sheet may include a convex lens layer having a pattern of convex lenses formed on a front surface thereof; a transparent layer placed under the convex lens layer and having a thickness corresponding to a focal distance of the convex lens; and an actual image print layer placed under the transparent layer.

The 3D sheet may include a convex lens layer having a pattern of convex lenses formed on a front surface thereof; a transparent layer placed under the convex lens layer and having a thickness corresponding to a focal distance of the convex lens; an actual image print layer placed on the transparent layer or on the convex lens layer; and a 3D print layer placed under the transparent layer and having the same pattern angle and arrangement as those of the convex lens layer.

The 3D sheet may include a convex lens layer having a pattern of convex lenses formed on a front surface thereof; a transparent layer placed under the convex lens layer and having a thickness corresponding to a focal distance of the convex lens; a 3D print layer placed under the transparent layer and having the same pattern angle and arrangement as those of the convex lens layer; an auxiliary transparent layer disposed on the convex lens layer; and an actual image print layer placed on or under the auxiliary transparent layer.

The 3D sheet may include: a complex lens layer having a pattern of convex lenses formed on a front surface thereof and a planar sight window formed in a certain area thereof; a transparent layer placed under the complex lens layer and having a thickness corresponding to a focal distance of the convex lens; and a complex layer placed under the transparent layer, and including a 3D print layer formed corresponding to the convex lens layer and an actual image print layer corresponding to the sight window.

Advantageous Effects

In an advertisement display device having a 3D sheet according to the present invention, the 3D sheet is attached to a light guide panel of a backlight unit disposed in a gaming machine and provides a sense of three-dimension to a character or figure such that the gaming machine can be seen from a distance, thereby enticing a game participant to the gaming machine and attracting maximum attention.

In addition, according to the present invention, monochromatic or three-color LEDs are arranged on a substrate in a circumferential region of the light guide panel of the backlight unit to realize a color change, thereby creating a pleasant atmosphere for a game participant.

Further, according to the present invention, a finishing member having a translucent coating layer or including a translucent material is provided to surround outer edges of the 3D sheet, the backlight unit and the substrate, thereby preventing exposure of the substrate while softly diffusing light emitted from the three-color LEDs.

Further, according to the present invention, a pop-up member is provided to project a character or figure on the 3D sheet, thereby improving a pop-up effect.

BRIEF DESCRIPTION

DETAILED DESCRIPTION

Hereinafter, exemplary embodiments of the present invention will be described with reference to the accompanying drawings.

It should be noted that the drawings are not to precise scale and may be exaggerated in thickness of lines or size of components for descriptive convenience and clarity. Furthermore, terms used herein are defined by taking functions of the invention into account and can be changed according to the custom or intention of users or operators. Therefore, the definition of the terms should be made according to overall disclosures set forth herein.

Figure 1:
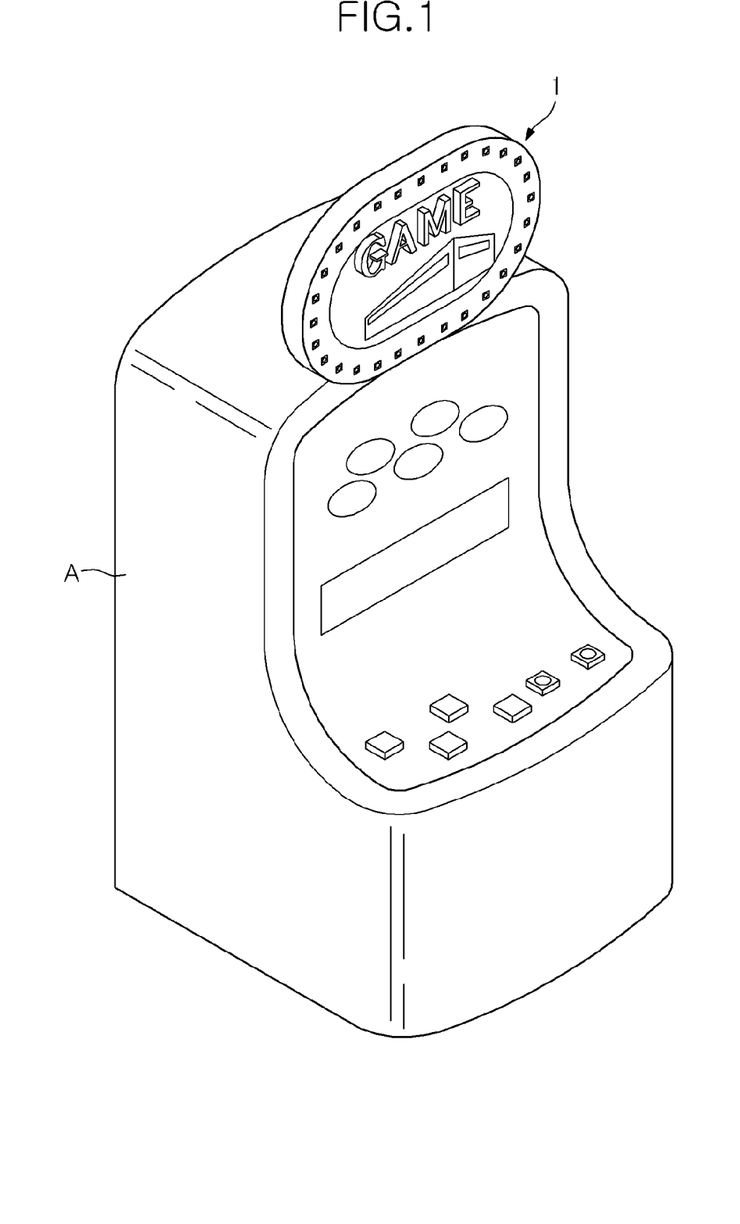
FIG. 1 is a view of a gaming machine with an advertisement display device having a 3D sheet according to one embodiment of the present invention.
Figure 2:
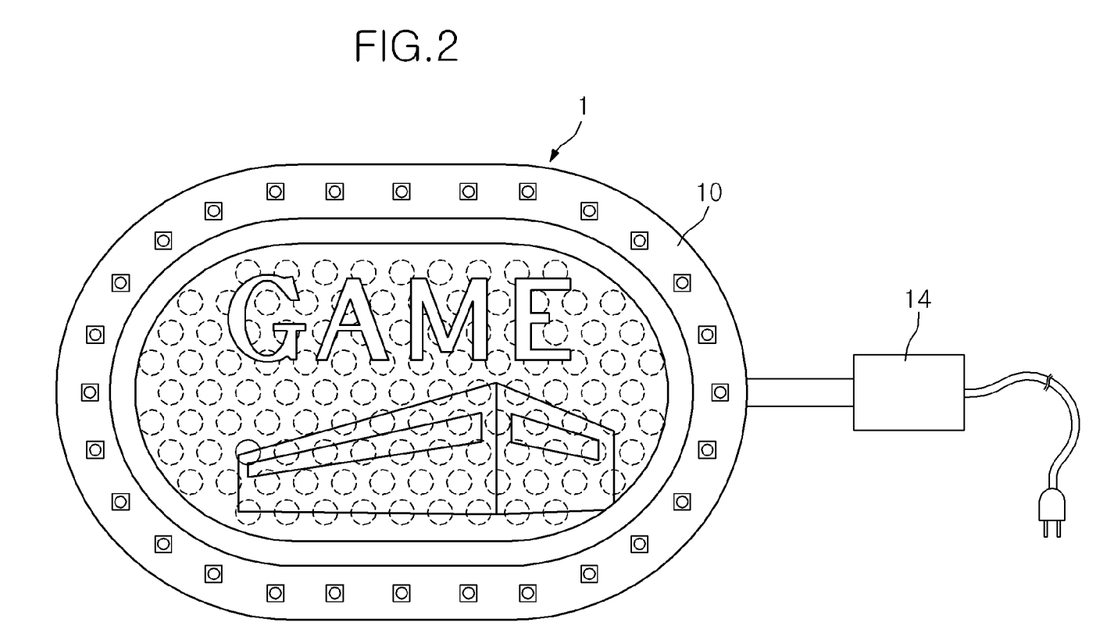
FIG. 2 is a front view of the advertisement display device having the 3D sheet according to the embodiment of the present invention.
Figure 3:
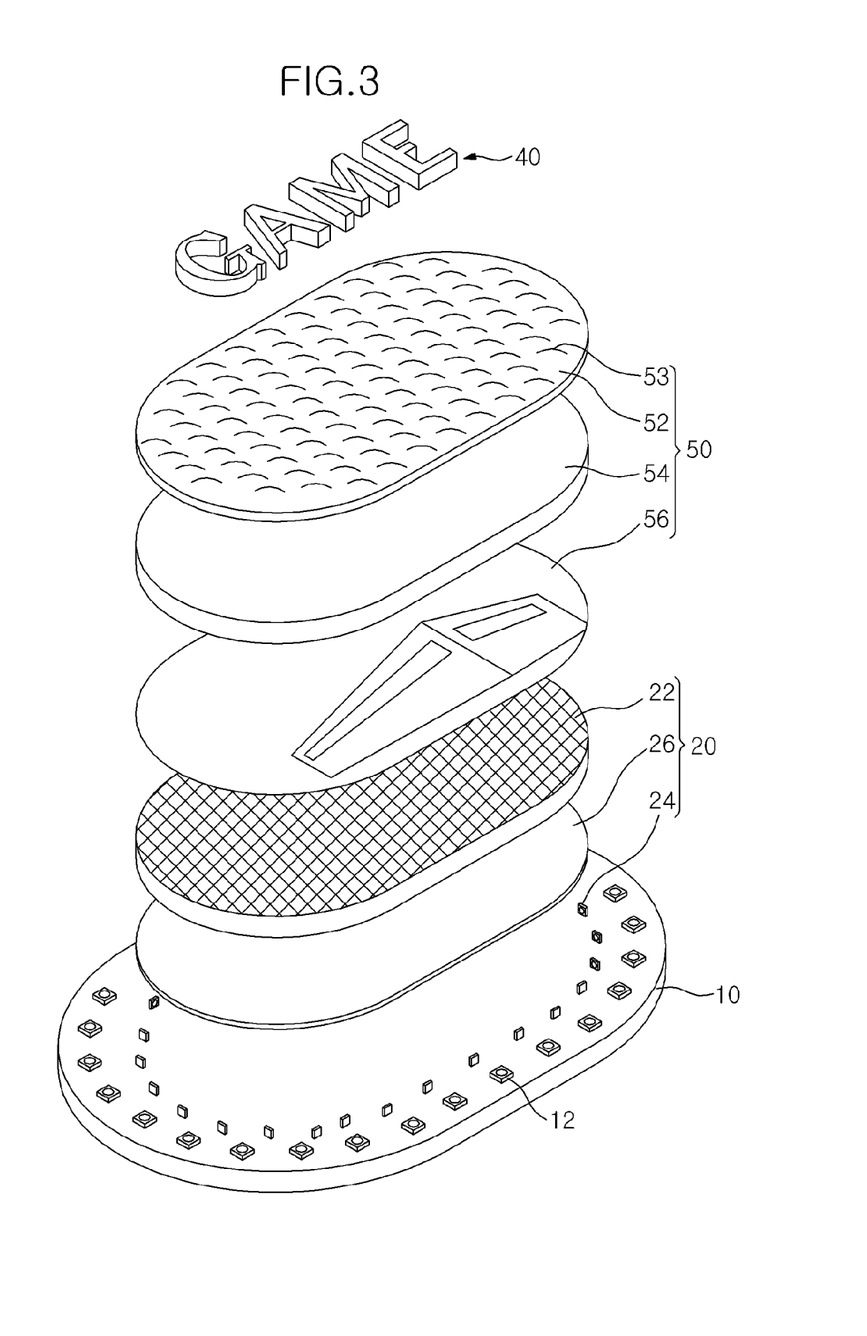
FIG. 3 is an exploded perspective view of the advertisement display device having the 3D sheet according to the embodiment of the present invention.

FIG. 1 is a view of a gaming machine with an advertisement display device having a 3D sheet according to one embodiment of the present invention, FIG. 2 is a front view of the advertisement display device having the 3D sheet according to the embodiment of the present invention, and FIG. 3 is an exploded perspective view of the advertisement display device having the 3D sheet according to the embodiment of the present invention.

Figure 4:
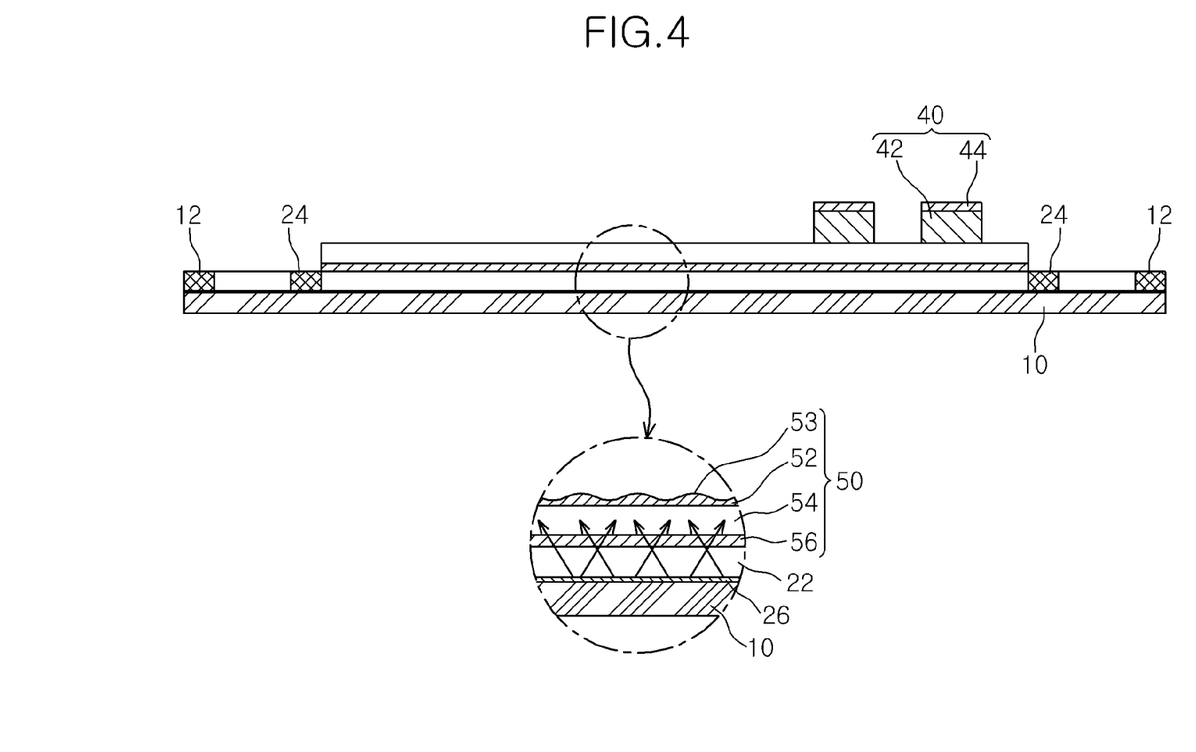
FIG. 4 is a cross-sectional view of the advertisement display device having the 3D sheet according to the embodiment of the present invention.
Figure 5:
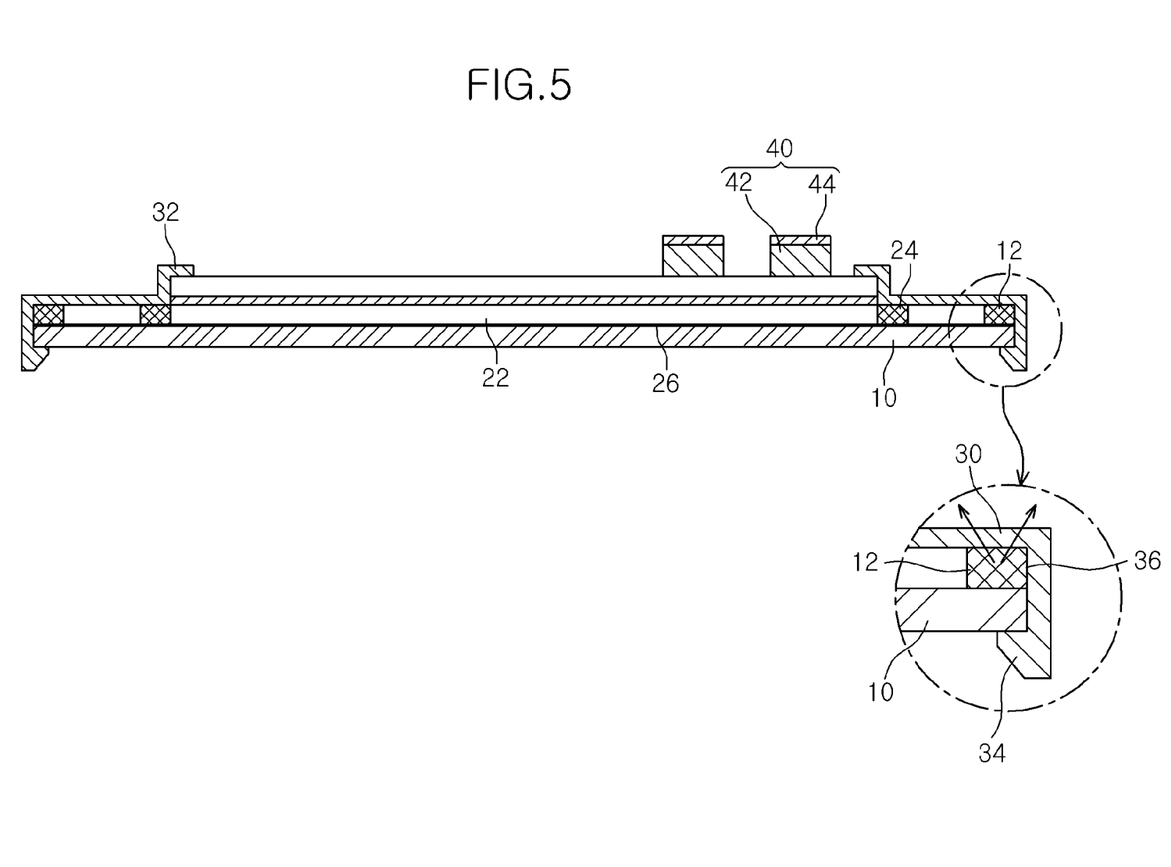
FIG. 5 is a cross-sectional view of modification of the advertisement display device having the 3D sheet according to the embodiment of the present invention.
Figure 6:
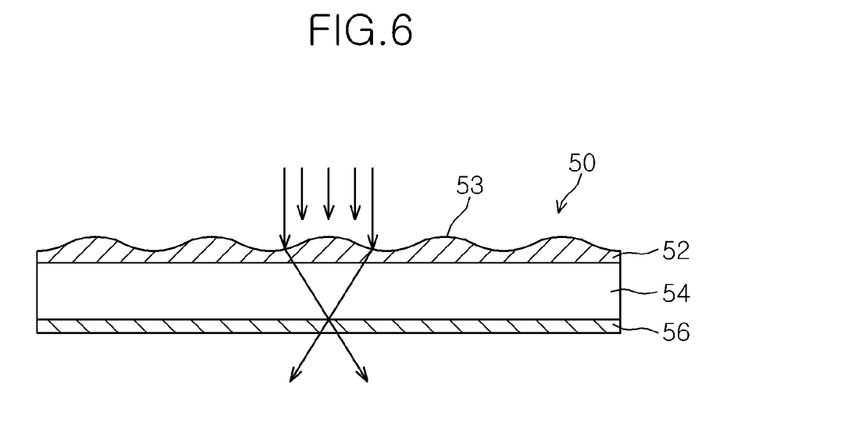
FIG. 6 is a cross-sectional view of the 3D sheet according to the embodiment of the present invention.

FIG. 4 is a cross-sectional view of the advertisement display device having the 3D sheet according to the embodiment of the present invention, FIG. 5 is a cross-sectional view of modification of the advertisement display device having the 3D sheet according to the embodiment of the present invention, FIG. 6 is a cross-sectional view of the 3D sheet according to the embodiment of the present invention, and FIGS. 7 to 11 are cross-sectional views of modifications of the 3D sheet according to the embodiment of the present invention.

Referring to FIGS. 1 to 6, an advertisement display device 1 having a 3D sheet according to one embodiment of the invention includes a substrate 10, a backlight unit 20, and a 3D sheet 50.

The advertisement display device 1 according to the present invention is disposed at an upper front side of a gaming machine A for a casino, such as a slot machine or the like, and uses the backlight unit and the 3D sheet to display an advertisement character or figure, thereby enticing a game participant.

The substrate 10 includes a plurality of first light sources 12 in an upper peripheral region thereof.

The first light sources 12 are monochromatic or three-color (red (R), green (G), and blue (B)) light emitting diodes (LEDs). The first light sources 12 are arranged at regular intervals in the peripheral region of the substrate 10.

The first light sources 12 are connected to a circuit pattern of the substrate 10 and controlled by a control unit 14 shown in FIG. 2.

The control unit 14 is connected to the circuit pattern of the substrate 10 through a socket or an electric wire.

With this configuration, the first light sources 12 provide change in color through the three-color LEDs in the peripheral region of the substrate 10, that is, in the peripheral region of the advertisement display device 1, thereby creating a pleasant atmosphere for a game participant.

An upper surface of the substrate 10 is divided into the peripheral region and a central region. The peripheral region of the substrate 10 forms a ring around the central region.

The substrate 10 may have one shape selected from among circular, elliptical and polygonal shapes. Among the polygonal shapes, a rectangular shape may be most commonly used. In this embodiment, the substrate 10 has an elliptical shape.

The backlight unit 20 is disposed in the central region of the substrate 10 inside the peripheral region thereof.

The backlight unit 20 includes a light guide panel 22 disposed in the central region of the substrate 10, a second light source 24 disposed on the substrate 10 and arranged on a circumferential surface of the light guide panel 22, and a reflective sheet 26 attached to a rear side of the light guide panel 22 such that light emitted from the second light source 24 can illuminate the light guide panel 22 in the forward direction.

The light guide panel 22 is formed with a pattern on an upper and/or lower surface thereof, such that light emitted from the second light source 24 and reflected from the reflective sheet 26 can be evenly diffused in the forward direction.

The second light source 24 is connected to the circuit pattern on the substrate 10 and controlled by the control unit 14 shown in FIG. 2.

The second light source 24 employs a white LED, but is not limited thereto. Alternatively, three-colors LEDs may be applied to the second light source 24.

Although not shown, a diffusion sheet and a prism sheet may be disposed above the light guide panel 22.

The advertisement display device 1 may be provided with a finishing member 30, which surrounds outer edges of the 3D sheet 50, the backlight unit 20 and the substrate 10.

The finishing member 30 includes a flange 32 latched to an upper corner of the 3D sheet 50.

The finishing member 30 is provided at a lower portion thereof with a plurality of latch hooks 34 to be latched to a lower side of the substrate 10.

The finishing member 30 serves as a cover for covering an outer edge of the advertisement display device 1.

The finishing member 30 is translucently formed by applying a translucent layer 36 to an outer or inner surface thereof or by adding a translucent material to a transparent resin. In this embodiment, the translucent layer 36 is applied to the inner surface of the finishing member 30.

The translucent layer 36 has a dark color such as black or the like such that light from the first light sources 12 can be diffused in the forward direction and softly shines through the 3D sheet. The finishing member 30, to which the translucent layer 36 is applied, may be formed of a synthetic resin, such as a polyvinyl chloride (PVC), polyethylene (PE), polypropylene (PP), etc.

In the advertisement display device 1 according to the present invention, instead of the finishing member 30, paint may be applied to the substrate 10 or a sheet may be adhered to surround the substrate 10 such that the circuit pattern on the substrate 10 cannot be exposed.

In some areas on the 3D sheet 50, pop-up members 40 are provided to show pop-up images of characters or figures, i.e., projecting images.

Each of the pop-up members 40 includes a transparent member 42 processed to have a character or figure shape and attached to the 3D sheet 50, and a 2D print layer 44 printed on the transparent member 42.

The transparent member 42 is generally formed of an acryl material having a preset thickness and is processed to have a character or figure shape.

The 2D print layer 44 is formed by printing a desired color on an overall or partial surface of the transparent member 42.

With this configuration, the pop-up member 40 realizes a projecting image of a character or figure protruding from the 3D sheet 50, thereby improving a pop-up effect and more effectively enticing a user to the gaming machine.

The 3D sheet 50 is disposed on the backlight unit 20 and realizes a 3D image with light emitted from the second light source 24.

As shown in FIGS. 3 and 6, the 3D sheet 50 includes a convex lens layer 52, which has a pattern of convex lenses 53 formed on a front surface thereof, a transparent layer 54 placed under the convex lens layer 52 and having a thickness corresponding to a focal distance of the convex lens 53, and an actual image print layer 56 placed under the transparent layer 54.

The convex lens layer 52 is formed of a transparent synthetic resin, and the convex lenses 53 have a semi-spherical shape and are arranged in longitudinal and transverse directions, or in a radial direction.

The transparent layer 54 may be formed of one selected from among a transparent resin, a transparent film or transparent glass.

The actual image print layer 56 is formed on a lower surface of the transparent layer 54 by offset printing. The actual image print layer 56 displays a picture relating to a subject, a photo of goods, various patterns, etc.

The actual image print layer 56 is placed at the focal distance of the convex lens 53, and provides a sense of depth and a sense of three-dimension by the thickness of the transparent layer 54.

Figure 7:
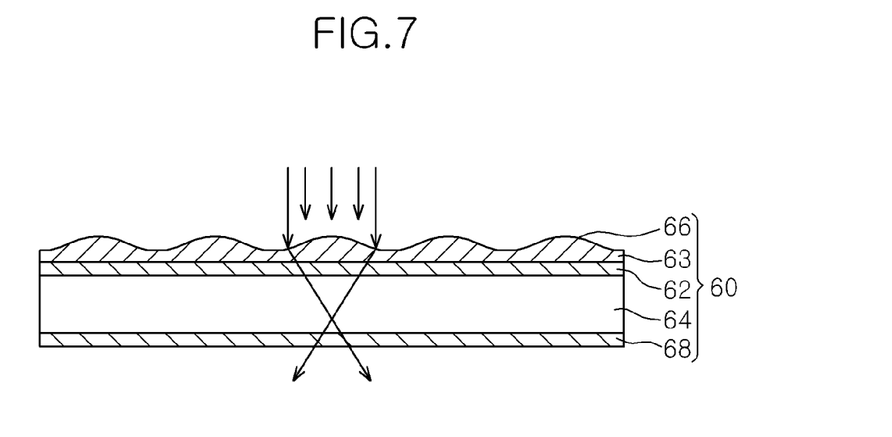
FIGS. 7 to 11 are cross-sectional views of modifications of the 3D sheet according to the embodiment of the present invention.

Referring to FIG. 7, a 3D sheet 60 according to another embodiment of the present invention includes a convex lens layer 62 having a pattern of convex lenses 63 formed on a front surface thereof, a transparent layer 64 placed under the convex lens layer 62 and having a thickness corresponding to a focal distance of the convex lens 63, an actual image print layer 66 placed on the transparent layer 54 or on the convex lens layer 62, and a 3D print layer 68 placed under the transparent layer 64 and having the same pattern angle and arrangement as those of the convex lens layer 62.

The convex lens layer 62 is formed of a transparent synthetic resin, and the convex lenses 63 have a semi-spherical shape and are arranged in longitudinal and transverse directions, or in a radial direction.

The actual image print layer 66 is formed on an upper surface of the transparent layer 64 by offset printing. The actual image print layer 66 displays a picture relating to a subject, a photo of goods, various patterns, etc.

In addition, the 3D print layer 68 is formed on a lower surface of the transparent layer 64 and is used in three-dimensional expression of up, down, left and right continuous patterns, special effects, and the like.

Unlike the 3D sheet 50 of FIG. 6, the actual image print layer 66 is placed at a non-focal distance of the convex lens 63 and the 3D print layer 68 is placed at the focal distance of the convex lens 63.

The 3D sheet 60 including the 3D print layer 68, the actual image print layer 66 and the transparent layer 64 simultaneously provides a sense of depth, a sense of three-dimension, and a sense of projection.

That is, the 3D sheet 60 according to this embodiment provides the sense of three-dimension by providing a three-dimensional image through the 3D print layer 68, and provides the sense of depth by expressing an image on the 3D print layer 68 and an image on the actual image print layer 66 with a transparent layer 64 interposed therebetween. In addition, the 3D sheet 60 according to this embodiment provides the sense of projection by expressing an image on the actual image print layer 66 to appear to protrude from an image on the 3D print layer 68 by the thickness of the transparent layer 64.

At this time, the 3D print layer 68 is printed by a process of printing four primary colors C, M, Y and K, or a spot color printing process, and manufactured by image segmentation of computer graphics.

Image segmentation provides outputs by performing both image segmentation of left and right lenticular images and image segmentation of up and down lenticular images. That is, the image segmentation is achieved in such a way that images obtained by taking binocular disparity into account are arranged in both directions, that is, in vertical and horizontal directions.

The convex lens layer 62, the actual image print layer 66, the transparent layer 64 and the 3D print layer 68, which constitute the 3D sheet 60, are thermally bonded to each other by a laminating operation, or by adhesives.

Figure 8:
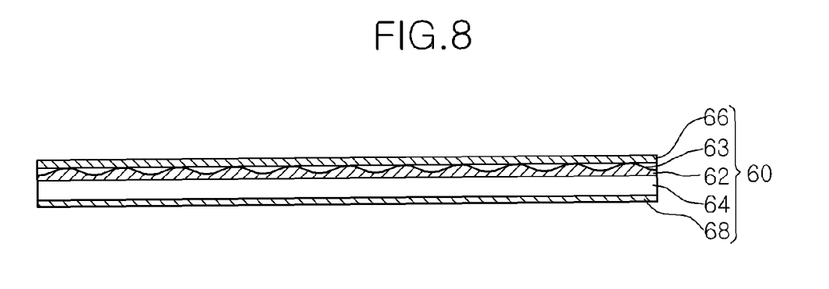

Alternatively, the actual image print layer 66 may be disposed on an upper surface of the convex lens layer 62 (see FIG. 8). This case can also provide the same sense of three-dimension as in the case where the actual image print layer 66 is disposed on the upper surface of the transparent layer 64.

Figure 9:
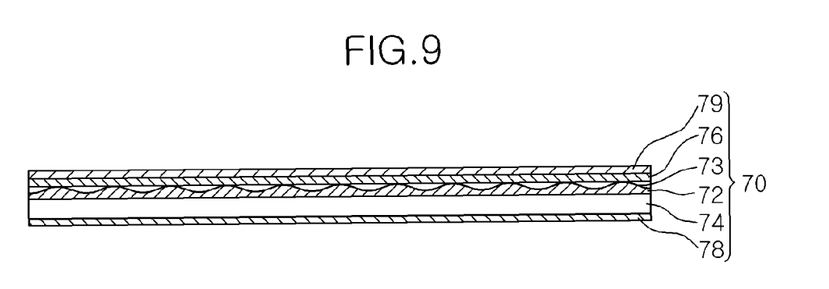
Figure 10:
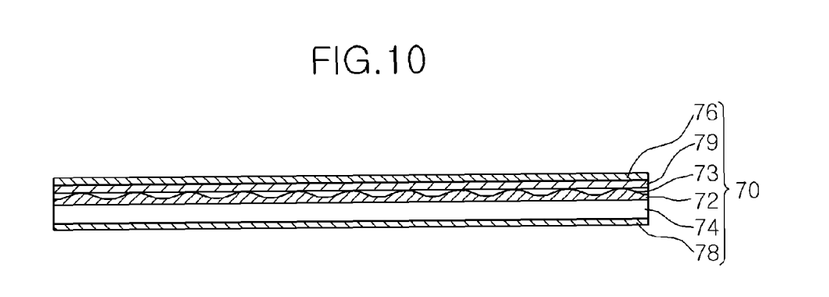

Further, FIGS. 9 and 10 show another example of the 3D sheet shown in FIG. 8. A 3D sheet 70 shown in FIGS. 9 and 10 includes a convex lens layer 72 having a pattern of convex lenses 73 formed on a front surface thereof, a transparent layer 74 placed under the convex lens layer 72 and having a thickness corresponding to a focal distance of the convex lens 73, a 3D print layer 78 placed under the transparent layer 74 and having the same pattern angle and arrangement as those of the convex lens layer 72, an auxiliary transparent layer 79 disposed on the convex lens layer 72, and an actual image print layer 76 placed on or under the auxiliary transparent layer 79.

That is, the 3D sheet 70 according to this embodiment includes the auxiliary transparent layer 79 on the convex lens layer 72 such that the actual image print layer 76 can be easily formed, and the actual image print layer 76 is formed on or under the auxiliary transparent layer 79, thereby providing a sense of three-dimension.

Figure 11:
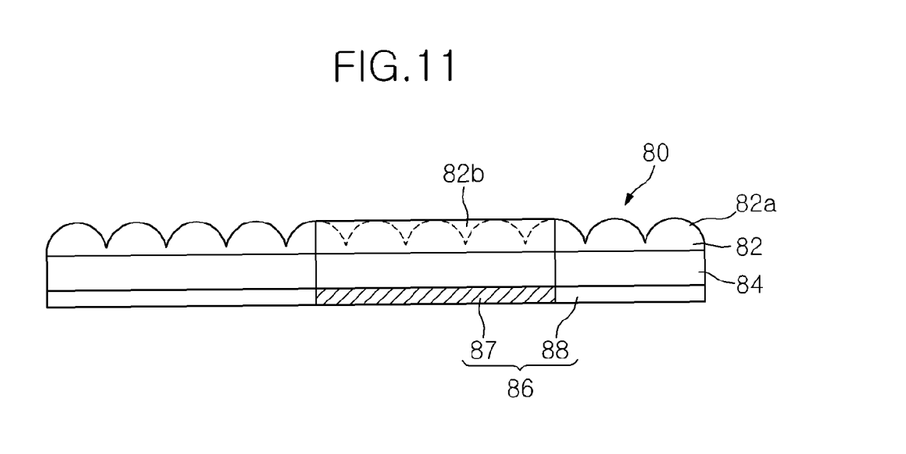

In addition, referring to FIG. 11, a 3D sheet 80 includes a complex lens layer 82 having a pattern of convex lenses 82a formed on a front surface thereof and a planar sight window 82b in a certain area, a transparent layer 84 placed under the complex lens layer 82 and having a thickness corresponding to a focal distance of the convex lens 82a, and a complex layer 86 placed under the transparent layer 84 and including a 3D print layer 88 corresponding to the convex lens layer 82a and an actual image print layer 87 corresponding to the sight window 82b.

That is, the complex layer 86 includes both the 3D print layer 88 and the actual image print layer 87 to increase printing efficiency while clearly realizing a minute character or figure even in the case where the minute character or figure is included in the actual image print layer 86b. Thus, it is possible to solve a problem of deterioration in resolution of the actual image print layer 87 by interference due to light refracted by the convex lens 82a.

On the other hand, the sight window 82b of the combined lens layer 82 may be formed by applying a transparent resin to the convex lens 82a, followed by curing. Various methods may be selected to form the sight window 82b, as needed.

In the advertisement display device 1 according to the present invention, the 3D sheet 50; 60; 70; 80 is attached to the light guide panel 22 of the backlight unit 20 disposed in the gaming machine A and provides a sense of three-dimension to a character or figure such that the gaming machine A can be seen from a distance, thereby enticing a game participant to the gaming machine and attracting maximum attention.

In addition, according to the present invention, monochromatic or three-color LEDs are arranged on the substrate 10 in the circumferential region of the light guide panel 22 of the backlight unit 20, thereby creating a pleasant atmosphere for a game participant.

Although some embodiments have been described herein, it should be understood by those skilled in the art that these embodiments are given by way of illustration only, and that various modifications, variations, and alterations can be made without departing from the spirit and scope of the present invention.

Accordingly, the scope of the present invention should be limited only by the accompanying claims and equivalents thereof.

The invention claimed is:

1. An advertisement display device having a three-dimensional (3D) sheet, comprising:
   a substrate;
   a backlight unit disposed on the substrate and emitting light; and
   a 3D sheet disposed on the backlight unit to display a 3D image by the light emitted from the backlight unit;
   wherein the 3D sheet comprises:
   a convex lens layer having a pattern of convex lenses formed on a front surface thereof;
   a transparent layer placed under the convex lens layer and having a thickness corresponding to a focal distance of the convex lens; and
   an actual image print layer placed under the transparent layer.

2. The advertisement display device according to claim 1, wherein the substrate is provided with a plurality of first light sources in an upper peripheral region thereof.

3. The advertisement display device according to claim 2, wherein each of the first light sources comprises monochromatic or three-color light emitting diodes, and are arranged at regular intervals in the peripheral region of the substrate.

4. The advertisement display device according to claim 1, wherein the backlight unit comprises:
   a light guide panel disposed in a central region of the substrate;
   a second light source disposed on the substrate and arranged on a circumferential surface of the light guide panel; and
   a reflective sheet attached to a rear side of the light guide panel such that light emitted from the second light source illuminates the light guide panel in a forward direction.

5. The advertisement display device according to claim 4, wherein the second light source comprises a white LED or three-color LEDs.

6. The advertisement display device according to claim 1, further comprising: a finishing member surrounding outer edges of the 3D sheet, the backlight unit and the substrate.

7. The advertisement display device according to claim 6, wherein the finishing member comprises:
   a flange latched to an upper corner of the 3D sheet; and
   a plurality of latch hooks latched to a lower side of the substrate.

8. The advertisement display device according to claim 6, wherein the finishing member is translucently formed by applying a translucent layer to an outer or inner surface thereof or by adding a translucent material to a transparent resin.

9. The advertisement display device according to claim 1, further comprising: a pop-up member placed in a certain region on the 3D sheet and providing a pop-up image of a character or figure.

10. The advertisement display device according to claim 9, wherein the pop-up member comprises:
    a transparent member including a character or figure shape and attached to the 3D sheet; and
    a two-dimensional (2D) print layer printed on the transparent member.

11. The advertisement display device according to claim 1, wherein the 3D sheet comprises:
    a convex lens layer having a pattern of convex lenses formed on a front surface thereof;
    a transparent layer placed under the convex lens layer and having a thickness corresponding to a focal distance of the convex lens;
    an actual image print layer placed on the transparent layer or on the convex lens layer; and
    a 3D print layer placed under the transparent layer and having the same pattern angle and arrangement as those of the convex lens layer.

12. The advertisement display device according to claim 1, wherein the 3D sheet comprises:
    a convex lens layer having a pattern of convex lenses formed on a front surface thereof;
    a transparent layer placed under the convex lens layer and having a thickness corresponding to a focal distance of the convex lens;
    a 3D print layer placed under the transparent layer and having the same pattern angle and arrangement as those of the convex lens layer;
    an auxiliary transparent layer disposed on the convex lens layer; and
    an actual image print layer placed on or under the auxiliary transparent layer.

13. The advertisement display device according to claim 1, wherein the 3D sheet comprises:

a complex lens layer having a pattern of convex lenses formed on a front surface thereof and a planar sight window formed in a certain area thereof;

a transparent layer placed under the complex lens layer and having a thickness corresponding to a focal distance of the convex lens; and a complex layer placed under the transparent layer, and comprising a 3D print layer formed corresponding to the convex lens layer and an actual image print layer corresponding to the sight window.

14. An advertisement display device having a three-dimensional (3D) sheet, comprising:

a substrate;

a backlight unit disposed on the substrate and emitting light; and a 3D sheet disposed on the backlight unit to display a 3D image by the light emitted from the backlight unit;

wherein the 3D sheet comprises:

a convex lens layer having a pattern of convex lenses formed on a front surface thereof;

a transparent layer placed under the convex lens layer and having a thickness corresponding to a focal distance of the convex lens;

an actual image print layer placed on the transparent layer or on the convex lens layer; and a 3D print layer placed under the transparent layer and having the same pattern angle and arrangement as those of the convex lens layer.

15. An advertisement display device having a three-dimensional (3D) sheet, comprising:

a substrate;

a backlight unit disposed on the substrate and emitting light; and a 3D sheet disposed on the backlight unit to display a 3D image by the light emitted from the backlight unit;

wherein the 3D sheet comprises:

a convex lens layer having a pattern of convex lenses formed on a front surface thereof;

a transparent layer placed under the convex lens layer and having a thickness corresponding to a focal distance of the convex lens;

a 3D print layer placed under the transparent layer and having the same pattern angle and arrangement as those of the convex lens layer;

an auxiliary transparent layer disposed on the convex lens layer; and an actual image print layer placed on or under the auxiliary transparent layer.

16. An advertisement display device having a three-dimensional (3D) sheet, comprising:

a substrate;

a backlight unit disposed on the substrate and emitting light; and a 3D sheet disposed on the backlight unit to display a 3D image by the light emitted from the backlight unit;

wherein the 3D sheet comprises:

a complex lens layer having a pattern of convex lenses formed on a front surface thereof and a planar sight window formed in a certain area thereof;

a transparent layer placed under the complex lens layer and having a thickness corresponding to a focal distance of the convex lens; and a complex layer placed under the transparent layer, and comprising a 3D print layer formed corresponding to the convex lens layer and an actual image print layer corresponding to the sight window.

* * * * *